United States Patent
Kato et al.

(10) Patent No.: US 8,158,738 B2
(45) Date of Patent: Apr. 17, 2012

(54) ADHESIVE SILICONE RUBBER COMPOSITION AND SEPARATOR SEAL MATERIAL FOR FUEL CELLS

(75) Inventors: Chisato Kato, Toyota (JP); Kazutaka Iizuka, Toyota (JP); Osamu Hayashida, Annaka (JP); Takashi Aketa, Annaka (JP); Shigeki Shudo, Annaka (JP)

(73) Assignees: Toyota Jidosha Kabushiki Kaisha, Toyota-Shi (JP); Shin-Etsu Chemical Co., Ltd., Tokyo (JP)

( * ) Notice: Subject to any disclaimer, the term of this patent is extended or adjusted under 35 U.S.C. 154(b) by 249 days.

(21) Appl. No.: 12/599,421

(22) PCT Filed: Jun. 20, 2008

(86) PCT No.: PCT/JP2008/061687
§ 371 (c)(1),
(2), (4) Date: Nov. 9, 2009

(87) PCT Pub. No.: WO2008/156218
PCT Pub. Date: Dec. 24, 2008

(65) Prior Publication Data
US 2010/0216920 A1 Aug. 26, 2010

(30) Foreign Application Priority Data

Jun. 21, 2007 (JP) ................................. 2007-163407

(51) Int. Cl.
*C08G 77/08* (2006.01)

(52) U.S. Cl. ............................... 528/15; 528/31; 528/43
(58) Field of Classification Search .................... 528/15, 528/31, 43
See application file for complete search history.

(56) References Cited

U.S. PATENT DOCUMENTS

| 5,536,803 A | 7/1996 | Fujiki et al. |
| 6,780,518 B2 | 8/2004 | Azechi et al. |
| 7,288,322 B2 * | 10/2007 | Bosshammer ................ 428/447 |
| 2002/0132891 A1 * | 9/2002 | Azechi et al. ................ 524/261 |

FOREIGN PATENT DOCUMENTS

| JP | 8-53661 | 2/1996 |
| JP | 2002-201454 | 7/2002 |
| JP | 2003-7314 A | 1/2003 |
| JP | 2006-176688 A | 7/2006 |

* cited by examiner

*Primary Examiner* — Margaret Moore
(74) *Attorney, Agent, or Firm* — Birch, Stewart, Kolasch & Birch, LLP

(57) ABSTRACT

An adhesive silicone rubber composition comprising (A) 100 pbw of an organopolysiloxane containing at least two silicon-bonded alkenyl radicals, (B) 0.5-20 pbw of an organohydrogenpolysiloxane containing at least two Si—H radicals, (C) a hydrosilylation catalyst, and (D) 0.1-50 pbw of an organosilicon compound having at least one phenyl structure, at least one alicyclic epoxy radical, and at least one Si—H radical is applicable to an electrolyte membrane and a separator in a polymer electrolyte fuel cell to form a firm integrally molded part.

8 Claims, 1 Drawing Sheet

(1) 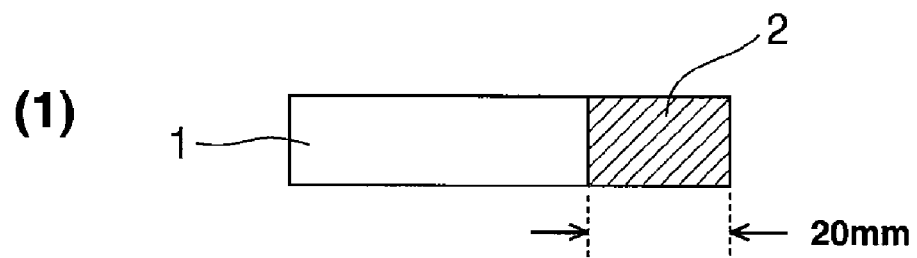
(2) 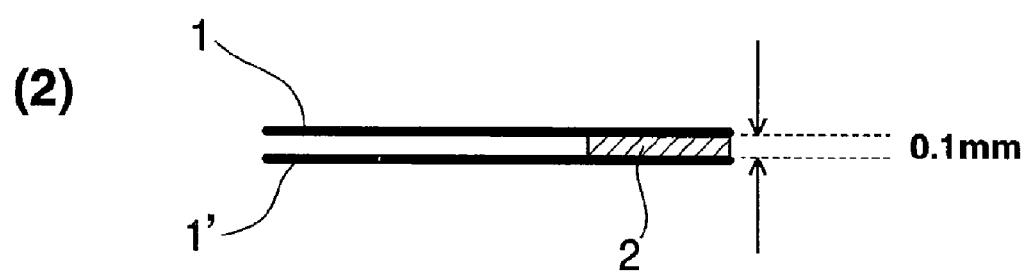
(3) 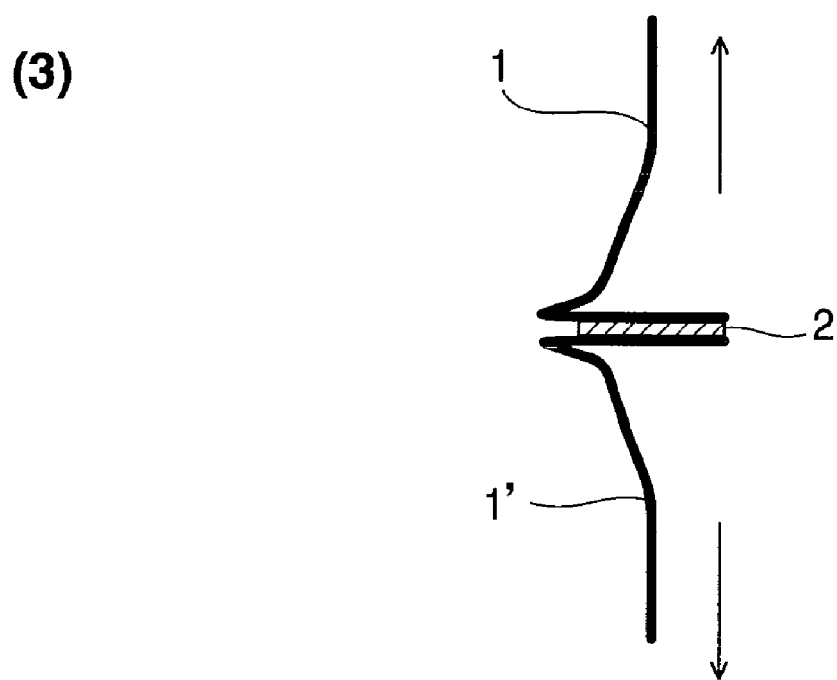

ADHESIVE SILICONE RUBBER COMPOSITION AND SEPARATOR SEAL MATERIAL FOR FUEL CELLS

TECHNICAL FIELD

This invention relates to an adhesive silicone rubber composition useful as a separator seal material for use in polymer electrolyte fuel cells (PEFC), and more specifically, as a separator seal material which is bondable to an electrolyte membrane or an electrolyte membrane and a member disposed adjacent thereto (e.g., a separator) in PEFC. It also relates to a separator seal material comprising the composition.

BACKGROUND ART

The fuel cell is capable of producing electricity without a substantial need for fossil fuel that poses concerns about resource depletion, without noise, and at a high energy recovery rate as compared with other energy-based power generating systems. Great efforts have been made to exploit the fuel cell as a power generating plant of relatively compact size in buildings and factories, with some cells having been commercially implemented. In particular, polymer electrolyte fuel cells (PEFC) featuring compactness can operate at lower temperature than fuel cells of other types. The PEFC then draws attention not only as a device for household co-generation, but also as the replacement power source for internal combustion engines on vehicles because of the minimized corrosion concern regarding the materials of which cell components are made and their ability to discharge relatively high current flow despite low temperature operation. The PEFC is constructed of electrolyte membranes, separators and other components. The separator is generally a plate which is provided with a plurality of parallel channels on one surface or both surfaces. The separator plays the role of conducting the electricity produced at the gas diffusion electrode within the fuel cell to the exterior, discharging water produced within the channels in the course of electricity generation, and securing the channels as a flow path for reaction gas input to the fuel cell. Such a fuel cell separator is required to be more compact in size. Since a plurality of separators are used in stack, there is a demand for a separator seal material having durability and long term service. Recently, it becomes a practice to apply a seal material to electrolyte membranes themselves to establish a better seal. In this case, silicone rubber must be fully adherent to not only separator substrates, but also electrolyte membranes. Additionally, its adhesion must last long because it must maintain acid resistance, water resistance and heat resistance.

While several methods are employed in the art for bonding silicone rubber to separators, one common method is by applying a primer to a separator substrate during its molding and bonding a silicone rubber composition thereto while molding it over the substrate. The method, however, includes cumbersome steps as demonstrated by unevenness of primer coating and drying variations, which cause some troubles. One approach taken to avoid such inconvenience is by using a silicone rubber composition having a tackifier previously admixed therein. This eliminates the step of primer coating and reduces the number of steps. For example, JP-A 8-53661 corresponding to U.S. Pat. No. 5,536,803 describes that an addition curable silicone rubber composition is made adherent to organic resins by adding thereto a tackifier having at least one silicon-bonded hydrogen atom and a phenyl structure in a molecule. Also JP-A 2002-201454 corresponding to U.S. Pat. No. 6,780,518 describes that a silicone rubber composition exerts selective adhesion to organic resins by adding thereto an organic compound or silicone having an epoxy radical and an aromatic ring. However, the compositions of these patents are not intended for use in fuel cells, and in fact, they are not fully adherent to electrolyte membranes, typically fluorochemical membranes. In the fuel cell separator sealing application, JP-A 2006-176688 discloses an addition curable silicone rubber composition which is made self-adhesive by adding a tackifier thereto. Although this composition is adherent to electrolyte membranes at the initial, the once established adhesion undesirably fails within a short time in an environmental test such as a hot water test.

DISCLOSURE OF THE INVENTION

An object of the invention is to provide an adhesive silicone rubber composition capable forming a firm bond to an electrolyte membrane or an electrolyte membrane and a member disposed adjacent thereto (e.g., separator) in a polymer electrolyte fuel cell (PEFC), and a separator seal material comprising the composition.

The inventors have found that when an organosilicon compound having at least one phenyl structure, at least one alicyclic epoxy radical, and at least one silicon-bonded hydrogen atom in a molecule is added to a silicone rubber composition, the resulting silicone rubber is self-adhesive to those members in a polymer electrolyte fuel cell that are allegedly difficult to bond in the prior art, specifically an electrolyte membrane typically made of Nafion® or an electrolyte membrane and a member disposed adjacent thereto (e.g., separator). The composition is thus well suited as a PEFC separator seal material.

In one aspect, the invention provides an adhesive silicone rubber composition to be applied to an electrolyte membrane or an electrolyte membrane and a member disposed adjacent thereto in a PEFC, the composition comprising (A) 100 parts by weight of an organopolysiloxane containing at least two silicon-bonded alkenyl radicals in a molecule, (B) 0.5 to 20 parts by weight of an organohydrogenpolysiloxane containing at least two silicon-bonded hydrogen atoms (or Si—H radicals) in a molecule, (C) a catalytic amount of a hydrosilylation catalyst, and (D) 0.1 to 50 parts by weight of an organosilicon compound having at least one phenyl structure, at least one alicyclic epoxy radical, and at least one silicon-bonded hydrogen atom in a molecule.

In a preferred embodiment, components (A) and (B) are used in such amounts that a molar ratio of Si—H radicals in component (B) to silicon-bonded alkenyl radicals in component (A) is in the range between 0.8 and 3.0. The silicone rubber composition may further comprise (E) 0.1 to 50 parts by weight of a nitrogen-containing compound as a low compression set additive. In a preferred embodiment, component (E) comprises at least one nitrogen-containing compound selected from triazole compounds and imidazole compounds.

Typically, the member is a separator made of metal or organic resin.

In another aspect, the invention provides a separator seal material for use in a PEFC, comprising the adhesive silicone rubber composition defined herein.

According to the invention, a firm integrally molded part of an adhesive silicone rubber composition and an electrolyte membrane and/or a member disposed adjacent thereto, typically separator is available. The separator used herein comprises an organic resin substrate obtained by integrally molding an electroconductive powder such as metal or carbon powder with the aid of a binder resin such as an epoxy, phenolic or polyimide resin.

BRIEF DESCRIPTION OF THE DRAWINGS

FIG. 1 schematically illustrates how to perform an adhesion test. FIG. 1-1 shows an electrolyte membrane with rubber sheeted thereon, FIG. 1-2 shows the rubber interposed between a pair of electrolyte membranes, and FIG. 1-3 shows the test where the electrolyte membranes are pulled in vertically opposite directions.

BEST MODE FOR CARRYING OUT THE INVENTION

Component (A) in the adhesive silicone rubber composition of the invention is an organopolysiloxane containing, on average, at least two alkenyl radicals per molecule. The alkenyl-containing organopolysiloxane used herein typically has the average compositional formula (1):

$$R^1_a SiO_{(4-a)/2} \tag{1}$$

wherein $R^1$, which may be the same or different, is selected from substituted or unsubstituted monovalent hydrocarbon radicals of 1 to 10 carbon atoms, and preferably 1 to 8 carbon atoms, and "a" is a positive number of 1.5 to 2.8, and preferably 1.8 to 2.5.

Examples of silicon-bonded, optionally substituted, monovalent hydrocarbon radicals represented by $R^1$ include alkyl radicals such as methyl, ethyl, propyl, isopropyl, butyl, isobutyl, tert-butyl, pentyl, neopentyl, hexyl, cyclohexyl, octyl, nonyl, and decyl; aryl radicals such as phenyl, tolyl, xylyl and naphthyl; aralkyl radicals such as benzyl, phenylethyl, and phenylpropyl; alkenyl radicals such as vinyl, allyl, propenyl, isopropenyl, butenyl, hexenyl, cyclohexenyl, and octenyl; and substituted forms of the foregoing in which some or all hydrogen atoms are substituted by halogen atoms (e.g., fluoro, bromo, chloro), cyano radicals or the like, such as chloromethyl, chloropropyl, bromoethyl, trifluoropropyl, and cyanoethyl. Preferably at least 90% of all $R^1$ radicals are methyl.

At least two of $R^1$ radicals must be alkenyl radicals, preferably having 2 to 8 carbon atoms, more preferably 2 to 6 carbon atoms, and most preferably vinyl. It is preferred that the content of alkenyl radicals be $5.0 \times 10^{-6}$ to $5.0 \times 10^{-3}$ mol/g of the organopolysiloxane, more specifically $1.0 \times 10^{-5}$ to $1.0 \times 10^{-3}$ mol/g. An alkenyl content of less than $5.0 \times 10^{-6}$ mol/g may lead to a lower rubber hardness, failing to establish a satisfactory seal. An alkenyl content of more than $5.0 \times 10^{-3}$ mol/g may lead to too high a crosslinking density, with the resulting rubber becoming brittle. The alkenyl radicals may be attached to the silicon atoms at the ends of the molecular chain or silicon atoms intermediate the molecular chain or both.

With respect to the structure, the organopolysiloxane has a generally straight chain structure and may include in part a branched or cyclic structure. While the molecular weight is not particularly limited, the organopolysiloxane used herein may range from a liquid one having a low viscosity to a gum-like one having a high viscosity. Specifically, a choice may be made among liquid ones having a weight average degree of polymerization of about 50 to about 2,000, more specifically about 100 to about 1,200, and even more specifically about 200 to about 700 as measured by gel permeation chromatography (GPC) versus polystyrene standards, and gum-like ones having a weight average degree of polymerization of about 2,000 to about 10,000, more specifically about 3,000 to about 10,000.

Component (B) is an organohydrogenpolysiloxane containing at least two, and preferably at least three silicon-bonded hydrogen atoms (or Si—H radicals) in a molecule. The organohydrogenpolysiloxane (B) serves as a curing agent for causing the composition to cure through hydrosilylating addition reaction of Si—H radicals in its molecule with silicon-bonded alkenyl radicals in organopolysiloxane (A) to induce crosslinking.

Typically the organohydrogenpolysiloxane has the following average compositional formula (2):

$$R^2_b H_c SiO_{(4-b-c)/2} \tag{2}$$

wherein $R^2$ is a substituted or unsubstituted monovalent hydrocarbon radical of 1 to 10 carbon atoms, "b" is a positive number of 0.7 to 2.1, "c" is a positive number of 0.001 to 1.0, and the sum of b+c is 0.8 to 3.0. The organohydrogenpolysiloxane should have at least 2 (ordinarily 2 to about 300), preferably at least 3 (ordinarily 3 to about 200), more preferably 3 to 100, most preferably 4 to 50 silicon-bonded hydrogen atoms (i.e., Si—H radicals) in a molecule. Examples of monovalent hydrocarbon radicals represented by $R^2$ are as exemplified for $R^1$, with those radicals free of aliphatic unsaturation being preferred. Also no epoxy radicals are contained. Preferably, b is a positive number of 0.8 to 2.0, c is a positive number of 0.01 to 1.0, and b+c is 1.0 to 2.5.

The molecular structure of the organohydrogenpolysiloxane may be linear, cyclic or branched, or three-dimensional network structure. Preferred are those organohydrogenpolysiloxanes in which the number of silicon atoms per molecule, that is, the degree of polymerization is 2 to about 300, and more preferably 4 to about 150, and which are liquid at room temperature (25° C.). The hydrogen atoms may be attached to the silicon atoms at ends of the molecular chain and/or silicon atoms midway the molecular chain.

Exemplary organohydrogenpolysiloxanes include 1,1,3,3-tetramethyldisiloxane, 1,3,5,7-tetramethylcyclotetrasiloxane, methylhydrogencyclopolysiloxane, methylhydrogensiloxane-dimethylsiloxane cyclic copolymers, tris(dimethylhydrogensiloxy)methylsilane, tris(dimethylhydrogensiloxy)phenylsilane, trimethylsiloxy-endcapped methylhydrogenpolysiloxane, trimethylsiloxy-endcapped dimethylsiloxane-methylhydrogensiloxane copolymers, dimethylhydrogensiloxy-endcapped dimethylpolysiloxane, dimethylhydrogensiloxy-endcapped dimethylsiloxane-methylhydrogensiloxane copolymers, trimethylsiloxy-endcapped methylhydrogensiloxane-diphenylsiloxane copolymers, trimethylsiloxy-endcapped methylhydrogensiloxane-diphenylsiloxane-dimethylsiloxane copolymers, trimethylsiloxy-endcapped methylhydrogensiloxane-methylphenylsiloxane-dimethylsiloxane copolymers, dimethylhydrogensiloxy-endcapped methylhydrogensiloxane-dimethylsiloxane-diphenylsiloxane copolymers, dimethylhydrogensiloxy-endcapped methylhydrogensiloxane-dimethylsiloxane-methylphenylsiloxane copolymers, copolymers of $(CH_3)_2HSiO_{1/2}$ units, $(CH_3)_3SiO_{1/2}$ units and $SiO_{4/2}$ units, copolymers of $(CH_3)_2HSiO_{1/2}$ units and $SiO_{4/2}$ units, and copolymers of $(CH_3)_2HSiO_{1/2}$ units, $SiO_{4/2}$ units, and $(C_6H_5)SiO_{3/2}$ units, and substituted forms of the foregoing in which some or all methyl radicals are substituted by other alkyl radicals (e.g., ethyl, propyl) or aryl radicals (e.g., phenyl). As used herein, the term "endcapped" refers to a compound capped with the indicated group at both ends.

An amount of the organohydrogenpolysiloxane compounded is 0.5 to 20 parts, and preferably 0.6 to 15 parts by weight per 100 parts by weight of component (A). Differently stated, the organohydrogenpolysiloxane (B) is preferably used in such an amount that a molar ratio of Si—H radicals in component (B) to silicon-bonded alkenyl radicals in component (A), simply referred to as "Si—H/alkenyl ratio," is in the range between 0.8:1 and 3.0:1, and more preferably between 1.0:1 and 2.0:1. If this ratio is less than 0.8 or more than 3.0, the compression set may be increased, leading to an insufficient seal.

Component (C) is a catalyst for hydrosilylation reaction or addition reaction. Suitable catalysts include platinum catalysts such as platinum black, platinic chloride, chloroplatinic acid, reaction products of chloroplatinic acid with monohydric alcohols, complexes of chloroplatinic acid with olefins, and platinum bisacetoacetate as well as palladium catalysts and rhodium catalysts. The addition reaction catalyst may be added in a catalytic amount, which is specifically about 0.5 to about 1000 ppm, and more specifically about 1 to about 500 ppm of platinum group metal based on the total weight of components (A) and (B).

Component (D), which is essential to the invention and also referred to as "tackifier," is an organosilicon compound having per molecule at least one phenyl structure (specifically monovalent phenyl radical), at least one alicyclic epoxy radical, and at least one silicon-bonded hydrogen atom (i.e., Si—H radical), and more specifically 1 to 5 phenyl structures, 1 to 5 alicyclic epoxy radicals and 1 to 5 Si—H radicals. The preferred organosilicon compounds are organosilanes and linear, cyclic or branched organosiloxanes (or oligomers) having about 2 to about 10, and more specifically about 4 to about 8 silicon atoms. The epoxy radicals used herein are alicyclic epoxy radicals such as 2,3-epoxycyclohexyl and 3,4-epoxycyclohexyl, which are linked to a silicon atom in the form of β-(2,3-epoxycyclohexyl)ethyl or β-(3,4-epoxycyclohexyl)ethyl. Alicyclic epoxy radicals are used herein for reactivity. Examples of such tackifiers include the following compounds.

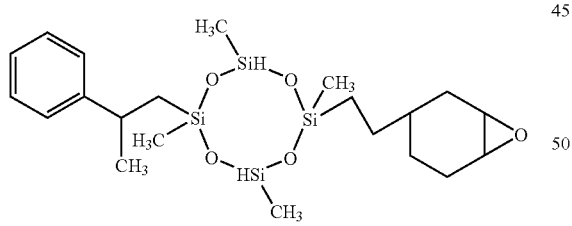

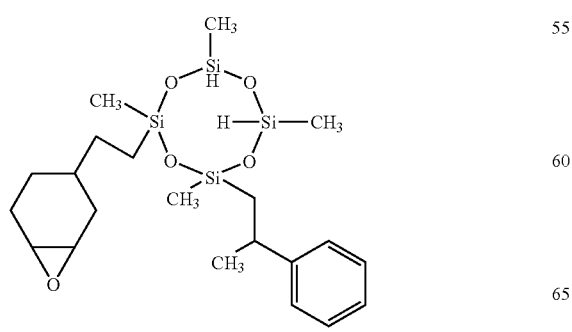

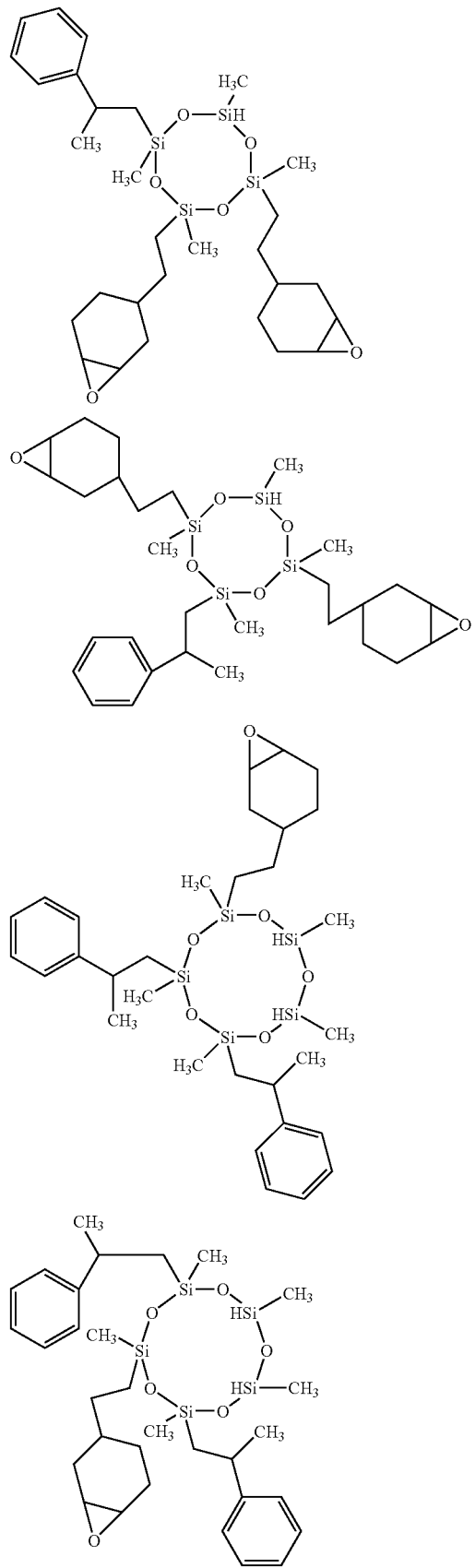

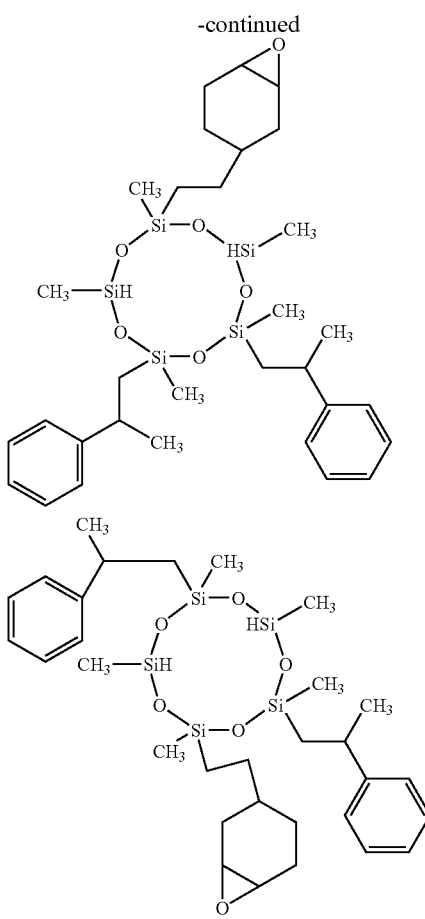

It is noted that the molecular formula represents an average structure.

The tackifiers may be used alone or in admixture.

The amount of the tackifier (D) compounded is 0.1 to 50 parts, and more specifically 0.2 to 30 parts by weight per 100 parts by weight of the organopolysiloxane (A). Less than 0.1 pbw of the tackifier may fail to impart sufficient adhesion whereas more than 50 pbw of the tackifier may detract from physical properties.

If necessary, an organic or organosilicon compound having one alkenyl radical and at least one ester radical may be compounded as an auxiliary tackifier or adhesion aid in combination with component (D). Exemplary organic or organosilicon compounds are those containing unsaturated carboxylic acids such as acrylic acid, methacrylic acid and vinylacetic acid and allyl esters such as allyl benzoate, diallyl phthalate, tetraallyl pyromellitate, and allyl acrylate.

Component (E) serves to reduce the compression set of the inventive composition. This low compression set additive is at least one nitrogen-containing compound selected from triazole compounds and imidazole compounds. Exemplary triazole compounds are 1,2,3-triazole, 1,2,4-triazole, benzotriazole, and N-trimethylsilyl-benzotriazole. Exemplary imidazole compounds are imidazole, 1-methylimidazole, and benzimidazole. These compounds may be used alone or in admixture.

The amount of the low compression set additive (E) compounded is specifically 0.1 to 50 parts, and more specifically 0.2 to 30 parts by weight per 100 parts by weight of the organopolysiloxane (A). Less than 0.1 pbw of the additive may fail to exert its effect whereas more than 50 pbw of the additive may cause under-cure.

The seal material is composed of the addition reaction curable silicone rubber composition comprising the above-described components and is applied to an electrolyte membrane or separator in PEFC by standard techniques well-known for silicone rubber compositions of this type. More specifically, the method of preparing a separator in PEFC using the seal material is by applying the silicone rubber composition by such a technique as dipping, coating, screen printing or insert molding, to form an integrated part of a separator and/or an electrolyte membrane and the seal material. The curing conditions include a temperature of 100° C. to 300° C. and a time of 10 seconds to 30 minutes. The separator used herein is typically obtained by integrally molding an electroconductive powder of metal, carbon or the like with the aid of a binder such as an epoxy or phenolic resin. The electrolyte membrane used herein is typically made of a phenyl or fluorine based electrolyte.

EXAMPLE

Examples of the invention are given below by way of illustration and not by way of limitation. All parts are by weight.

Tackifier #1

A tackifier #1 was prepared by adding dropwise 1 mole of α-methylstyrene and 1 mole of Celloxide 2000 (1,2-epoxy-4-vinylcyclohexene, Daicel Chemical Industries, Ltd.) to 1 mole of 1,3,5,7-tetramethylcyclotetrasiloxane and allowing addition reaction to run in the presence of a platinum catalyst.

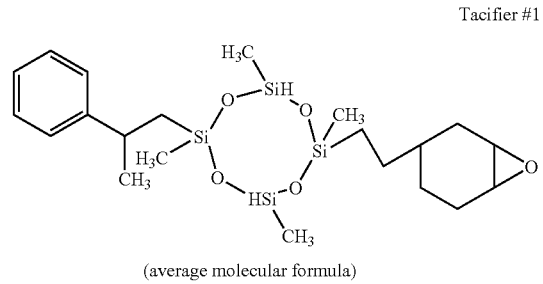

Tacifier #1

(average molecular formula)

Tackifier #2

A tackifier #2 was prepared by adding dropwise 1 mole of α-methylstyrene and 2 moles of Celloxide 2000 (Daicel Chemical Industries, Ltd.) to 1 mole of 1,1,1,3,5,7,9,11,11,11-decamethylhexasiloxane and allowing addition reaction to run in the presence of a platinum catalyst.

Tackifier #2

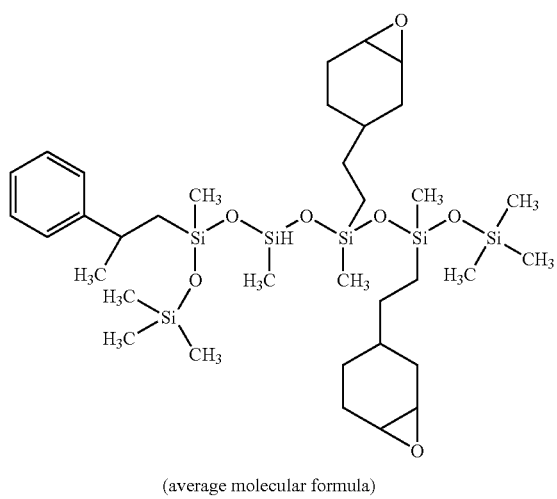

(average molecular formula)

Tackifiers #3, #4 (Comparison)

A tackifier #3 or #4 was prepared by adding dropwise 1 mole of α-methylstyrene alone or 1 mole of Celloxide 2000 (Daicel Chemical Industries, Ltd.) alone to 1 mole of 1,3,5,7-tetramethylcyclotetrasiloxane and allowing addition reaction to run in the presence of a platinum catalyst.

Tackifier #3

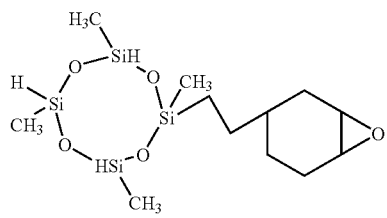

Tackifier #4

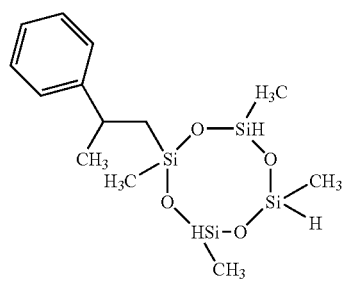

Examples 1, 2 and Comparative Examples 1 to 3

A silicone rubber premix was obtained by mixing 68 parts of a dimethylvinylsiloxy-endcapped dimethylpolysiloxane having an average degree of polymerization of 500 with 32 parts of fumed silica having a specific surface area of 200 m$^2$/g (Aerosil 200 by Nippon Aerosil Co., Ltd.), 5 parts of hexamethyldisilazane, and 2.0 parts of water at room temperature for 30 minutes, heating the mixture at 150° C., agitating the mixture at the temperature for 3 hours, and allowing to cool down. The silicone rubber premix, 100 parts, was combined with 40 parts of a dimethylvinylsiloxy-endcapped dimethylsiloxane having an average degree of polymerization of 250, followed by 30 minutes of agitation. To this mixture were added 2.2 parts (to provide a Si—H/alkenyl ratio of 1.5) of a methylhydrogenpolysiloxane having Si—H radicals at both ends and side chains (degree of polymerization 17, Si—H content 0.0060 mol/g) as a crosslinker and 0.05 part of ethynyl cyclohexanol as a reaction regulator. The mixture was agitated for 15 minutes, yielding a silicone rubber base 1.

To 100 parts of silicone rubber base 1 was added 5 parts of either one of tackifiers #1 to #4 or 1,3,5,7-tetramethylcyclotetrasiloxane. Then 0.1 part of a platinum catalyst (to provide a Pt concentration of 1 wt %) was added to the base, which was deaerated, yielding a silicone rubber composition.

An adhesion test was performed as illustrated in FIG. 1. There was furnished an electrolyte membrane 1 (including reinforcing PET film) having a width of 25 mm, a length of 50 mm and a thickness of 0.1 mm which was available as Nafion 117 from Aldrich. The silicone rubber composition 2 was sheeted on a 20 mm end portion of membrane 1 (see FIG. 1-1). Another electrolyte membrane 1' was attached thereto so that the silicone rubber composition was interposed between the membranes (see FIG. 1-2). The composition was press molded at 120° C. for 10 minutes and post-cured at 150° C. for 1 hour. The specimen was put in a pressure vessel together with deionized water where a hot water test was carried out at 90° C. for 100 hours. Before and after the hot water test, the electrolyte membranes were pulled in vertically opposite directions until failure (see FIG. 1-3). The fracture section was observed. The specimen was rated "○" for good bond strength when the rubber failed, "X" for weak bond strength when the rubber stripped completely from either foil, and "Δ" for partial rubber failure.

TABLE 1

| Components (pbw) | Example | | Comparative Example | | |
|---|---|---|---|---|---|
| | 1 | 2 | 1 | 2 | 3 |
| Silicone rubber base 1 | 100 | 100 | 100 | 100 | 100 |
| Pt catalyst | 0.1 | 0.1 | 0.1 | 0.1 | 0.1 |
| Tackifier #1 | 5 | | | | |
| Tackifier #2 | | 5 | | | |
| Tackifier #3 | | | 5 | | |
| Tackifier #4 | | | | 5 | |
| 1,3,5,7-tetramethylcyclotetrasiloxane | | | | | 5 |
| Initial adhesion to electrolyte membrane | ○ | ○ | Δ | X | X |
| Adhesion to electrolyte membrane after hot water test | ○ | ○ | X | X | X |

Tackifier #5 (Comparison)

A tackifier #5 was prepared by adding dropwise 5 moles of allyl glycidyl ether to 1 mole of 1,3,5,7,9-pentamethylcyclopentasiloxane and allowing addition reaction to run in the presence of a platinum catalyst.

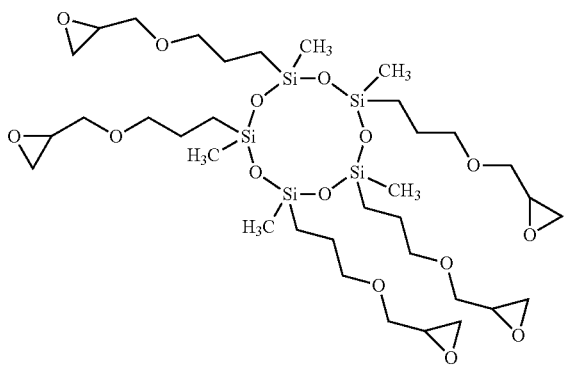

Tackifier #5

Comparative Example 4

A composition was prepared as in Example 1 except that tackifier #5 was used instead of tackifier #1. It was similarly tested.

TABLE 2

| Components (pbw) | Comparative Example 4 |
| --- | --- |
| Silicone rubber base 1 | 100 |
| Pt catalyst | 0.1 |
| Tackifier #5 | 5 |
| Initial adhesion to electrolyte membrane | ○ |
| Adhesion to electrolyte membrane after hot water test | X |

It is evident from Tables 1 and 2 that the adhesive silicone rubber compositions within the scope of the invention are self-adhesive and firmly bondable to electrolyte membranes.

The invention claimed is:

1. An adhesive silicone rubber composition to be applied to an electrolyte membrane or an electrolyte membrane and a member disposed adjacent thereto in a polymer electrolyte fuel cell, said composition comprising
    (A) 100 parts by weight of an organopolysiloxane containing at least two silicon-bonded alkenyl radicals in a molecule,
    (B) 0.5 to 20 parts by weight of an organohydrogenpolysiloxane containing at least two silicon-bonded hydrogen atoms (or Si—H radicals) in a molecule,
    (C) a catalytic amount of a hydrosilylation catalyst, and
    (D) 0.1 to 50 parts by weight of an organosilicon compound having at least one phenyl structure, at least one alicyclic epoxy radical, and at least one silicon-bonded hydrogen atom in a molecule.

2. The silicone rubber composition of claim 1 wherein a molar ratio of Si—H radicals in component (B) to silicon-bonded alkenyl radicals in component (A) is in the range between 0.8 and 3.0.

3. The silicone rubber composition of claim 1, further comprising (E) 0.1 to 50 parts by weight of a nitrogen-containing compound as a low compression set additive.

4. The silicone rubber composition of claim 3 wherein component (E) comprises at least one nitrogen-containing compound selected from triazole compounds and imidazole compounds.

5. The silicone rubber composition of claim 1 wherein the member is a separator made of metal or organic resin.

6. The silicone rubber composition of claim 1 wherein component (D) is an organopolysiloxane having 1 to 5 phenyl structures, 1 to 5 alicyclic epoxy radicals, 1 to 5 Si—H radicals and 4 to 10 silicon atoms.

7. The silicone rubber composition of claim 1 wherein the alicyclic epoxy radical in component (D) is 2,3-epoxycyclohexyl radical or 3,4-epoxycyclohexyl radical.

8. A separator seal material for use in a polymer electrolyte fuel cell, comprising the adhesive silicone rubber composition of any one of claim 1 to 5, 7, or 6.

* * * * *